United States Patent Office 2,755,209
Patented July 17, 1956

2,755,209

COMPOSITION AND METHOD FOR REMOVING HARDENED SILICONE RESIN GLAZES FROM METAL SURFACES

Ira J. Duncan, Detroit, Mich., assignor to Detrex Corporation, Detroit, Mich., a corporation of Michigan No Drawing. Application March 24, 1953,
Serial No. 344,449

10 Claims. (Cl. 134—29)

This invention relates to compositions and methods for removing hardened silicone resin glazes from metal surfaces and more particularly relates to compositions containing an alkali metal base, a chlorinated hydrocarbon and a co-solvent therefor and to a process which comprises contacting the silicon resin with the aforementioned composition and removing said silicone resin from its associated metallic surface by rinsing with water. This application relates to those compositions and methods wherein the co-solvent is in the form of an alcohol, as distinguished from the glycol-ethers which are disclosed and claimed in my copending application Serial No. 77,441, now U. S. Patent No. 2,662,837, granted December 15, 1953, of which this application is a continuation-in-part.

The silicone resins removed by the processes and compositions of this invention are long-chain polymers quite different physically and chemically from silicone greases and similar short-chain silicone polymers of relatively low molecular weight. The hardened silicone resins treated in accordance with this invention are sometimes referred to as hardened siloxane resinous coatings. Various references are found in the patent literature and in other literature to the effect that compositions containing an alkali metal hydroxide and an alcohol are effective in dissolving silicone resins, but upon following such teachings in an attempt to dissolve long-chain hardened or baked silicone resin glazes it has been found either that no reaction takes place or that the reaction is too slow to permit any practical use in industry unless a mixture containing a dangerously high percentage of corrosive caustic soda is used. Even in the latter case the resin removal is incomplete and vigorous application of mechanical force is needed to remove the residual glaze. Several references mention the solubility of silicone resins in various solvents such as benzene, toluene, ethers, gasoline and oils such as soya bean oil or linseed oil, but these too are necessarily restricted to the silicon resins of lower molecular weight since the hardened or baked silicone resin glazes have been found to resist the action of any of the aforementioned compositions.

It is therefore an object of this invention to remove a hardened or baked silicone resin glaze of high molecular weight from an associated surface. It is a further object to provide a harmless, non-corrosive composition for converting an insoluble hardened or baked silicon glaze of high molecular weight to a composition easily removed with water. A still further object of the invention is to provide a process for removing such a silicone resin glaze without exerting undue mechanical force. Other objects will appear hereinafter.

The foregoing and other objects are attained by the novel combination of an alkali metal base, a chlorinated hydrocarbon, and a co-solvent for said alkali metal base and chlorinated hydrocarbon. When a long-chain silicone polymer is contacted with the inventive composition, a physical or chemical change takes place in the resin by which the resin is made easily removable from the associated surface by rinsing with water.

The term "alkali metal base" as used in the description of this invention is meant to include the basic compounds of the metals sodium, potassium lithium, rubidium, caesium and the like, including the hydroxides, oxides, alcoholates and their equivalents.

The chlorinated hydrocarbons which comprise another component in compositions of this invention are either partially chlorinated or fully chlorinated hydrocarbons of the group which includes methylene chloride, carbon tetrachloride, and perchlorethylene. Methylene chloride has the formula $CH_2Cl_2$ and is a colorless liquid boiling at 42° C. Carbon tetrachloride, $CCl_4$, is also a colorless liquid and boils at 76° C. Perchlorethylene, an unsaturated chlorinated hydrocarbon is also known as tetrachlorethylene and has the formula $CCl_2=CCl_2$. It is a colorless liquid boiling at 121° C. Among the chlorinated hydrocarbons perchlorethylene is preferred in the practice of this invention since its effectiveness is superior and it is non-flammable and has a low toxicity. Trichlorethylene should be avoided in practicing this invention since it is readily dehydrochlorinated or mixing with an alkali metal base and forms explosive peroxide compounds.

The co-solvents chosen as components of the inventive compositions must possess the property of dissolving the alkali metal base and should be miscible in substantial proportions with the chlorinated hydrocarbons. Many of the aliphatic alcohols such as unsubstituted alcohols and ether-alcohols are effective co-solvents for alkali metal bases and the aforementioned chlorinated hydrocarbons, such as ethanol, iso-propyl alcohol, n-propyl alcohol, n-butyl alcohol, isobutyl alcohol, secondary butyl alcohol, the amyl alcohols, propylene glycol, dipropylene glycol and tripropylene glycol and the like. Various other alcohols, ether-alcohols, and even ring compounds such as morpholine and the like possess co-solvent properties for an alkali metal base on the one hand and methylene chloride, carbon tetrachloride, or perchlorethylene on the other.

In the aforementioned compositions, particularly those containing enough alkali metal base to brighten a tin plated base metal, the use of a corrosion inhibitor is found to be advantageous. The following compounds have been found to be effective in reducing the corrosion or brightening of tin surfaces when provided as components of compositions of this invention: Hydroquinone, pyrogallol, pyrogallic acid, nitrobenzene, benzoyl peroxide, furfural, furfuryl alcohol, phenol and cresol.

In practice, the compositions of this invention are conveniently formulated by mixing the co-solvent, chlorinated hydrocarbon, and inhibitor. To this mixture the alkali metal base, either in the dry state or as a concentrated aqueous solution, is added. The composition may be applied to the work free of water or in combination with a small amount of water which improves its cleaning properties. The composition is preferably heated to a temperature of approximately 55°–75° C. and contacted with the silicone resin glaze desired to be removed. After a few minutes have elapsed the silicone resin glaze apparently undergoes a gradual change and upon removing the composition of this invention from the surface of the glaze the silicone resin is completely removed by rinsing with water.

The three major components of this composition are effective over a wide range of proportions and the effectiveness of the mixture diminishes only when the chlorinated hydrocarbon or the alkali metal base is present in a very low percentage. It may be stated generally that the alkali metal base should comprise at least .02% and the chlorinated hydrocarbon 1% by weight of the composition in order to attain a noticeable improvement in glaze removal. The amount of alkali metal base is preferably held below 5% by weight when the silicone resin to be removed is associated with a tin surface or other surface easily attacked by strong alkalis. The proportion of co-solvent in the composition may be varied widely but it is generally necessary to provide enough co-solvent to dissolve the bulk of the alkali metal base present and to effect solution with the other components of the composition. The proportion of chlorinated hydrocarbon similarly varies widely and is determined by the proportions of the other ingredients, and excellent results are attained in some compositions containing as much as 97% by weight perchlorethylene, methylene chloride, or carbon tetrachloride.

Experiments have indicated that unusually fast glaze removal is attained without brightening a tin surface upon which the resin has been deposited as a glaze when ethanol is provided as co-solvent and the proportion of alkali metal base lies between 0.05% by weight and 1.5% by weight and the chlorinated hydrocarbon comprises 70–95% by weight. When these ideal compositions are contacted with a silicone resin glaze for a few minutes at a temperature of about 75° C. the hard baked resin is changed and is easily removed in a subsequent water rinse. The stability and anticorrosion properties of these compositions are enhanced by addition of 0.25–1.0% phenol.

The remarkable ability of the inventive compositions to condition hardened silicone resin glazes so that they are removable by water does not appear to result from any property of an individual component of the composition. Caustic soda and similar alkali metal bases are without effect on long-chain silicone glazes and the chlorinated hydrocarbons alone similarly do not attack such glazes even after long periods of contact at elevated temperature. The co-solvents mentioned herein are similarly ineffective when used alone. Moreover, the combinations of such co-solvents with said chlorinated hydrocarbons are either without effect or react with long-chain silicone resin glazes very slowly and incompletely and do not provide removal. The combination of alkali metal bases with the co-solvents listed herein in most cases react slowly with the long-chain silicone resin glazes and tend to produce undesirable bright tin surfaces. It is only when all three components are incorporated into the combination that the mixture acts rapidly and thoroughly effecting complete removal of the silicone resin glaze. Strangely enough the inventive composition retains its effectiveness even when the proportion of chlorinated hydrocarbon exceeds 90%. While the reasons for the unusual action of the inventive compositions are not known, it is apparent that the silicone resin glaze is not dissolved by the compositions of this invention but is attacked physically or chemically or possibly physically and chemically in such a way that the attacked glaze is so readily soluble in water that it may be removed by rinsing with water without wiping or rubbing. The unique and unexpected nature of the way in which the processes and compositions of the present invention operate will appear from the specific examples set forth below.

*Example 1.*—A silicone resin marketed under the tradename "Pan Glaze" by the Dow-Corning Corporation, Midland, Michigan, was applied to the surface of a tin-plated bread pan and the pan was placed in a baking oven for the duration of a normal baking cycle and then removed. The pan was then immersed for 15 minutes in a solution containing .60 gram NaOH in 32.7 grams (about ⅓) ethanol and 66.7 grams (about ⅔) perchlorethylene and the solution maintained at about 75° C. Complete silicone glaze removal was attained on a subsequent water rinse followed by a slight wiping. No tin attack was apparent.

*Example 2.*—The procedure of Example 1 was followed using 0.1 gram NaOH, 5.2 grams ethanol and 94.7 grams perchlorethylene. A complete silicone glaze removal was attained without wiping and the tin attack was slight.

*Example 3.*—The procedure of Example 1 was followed, using the same composition as given in Example 1 except the 0.6 gram NaOH was replaced with 0.6 gram sodium methylate. Silicone removal was complete in 10 minutes at 75° C. without wiping and there was no tin attack.

*Example 4.*—A clear solution was prepared consisting of:

| | |
|---|---|
| Dipropylene glycol | cc__ 15 |
| NaOH | grams__ 2.3 |
| Perchlorethylene | cc__ 135 |

The solution was heated to 68° C. and a tin plated metal test piece, coated with silicone glaze as in Example 1, was immersed in the solution. On removing the test piece from the solution after 15 minutes immersion, rinsing with water and wiping the surface, cleaning was observed and there was no tin attack.

*Example 5.*—The procedure of Example 4 was followed, substituting an equal quantity of tripropylene glycol for the dipropylene glycol. The solution temperature was 70° C. Cleaning was observed, without tin attack, after a water rinse.

*Example 6.*—A solution was prepared consisting of 2 grams NaOH per 150 cc. isopropyl alcohol, and this solution was mixed with about 120 cc. perchlorethylene. Silicone glazed coated test strips of tin plated ferrous metal (prepared as in Example 1) were immersed in the solution for 5 minutes and then removed. The silicone resin appeared to dissolve in the solvent, and was easily removed from the metal surface by wiping.

*Example 7.*—A solution was prepared consisting of 4 grams NaOH in 105 cc. ethanol. 19 parts by weight of the solution were mixed with 81 parts by weight perchlorethylene. After five minutes at 70° C., good cleaning was obtained following the procedure of Example 1.

*Example 8.*—The following solution was prepared:

| | |
|---|---|
| NaOH | grams__ 4 |
| Isopropyl alcohol | cc__ 150 |

The solution was mixed with perchlorethylene in quantities of 80.6% alcohol by volume and 19.4% perchlorethylene by volume. Under test conditions as outlined in Example 1, excellent cleaning was obtained after 5 minutes, with light wiping of the test piece after removal from the solution.

This test was repeated using metal pieces of different physical shapes, with good cleaning results for said shapes. Solution temperatures of 64–68° C. and 60° C. were utilized in these tests.

*Example 9.*—A solution was prepared consisting of:

| | |
|---|---|
| NaOH | grams__ 2.5 |
| Amyl alcohol | cc__ 100 |
| Perchlorethylene | cc__ 17 |

Following the procedure of Example 8, excellent cleaning was obtained after 7 minutes without tin attack. Only light surface wiping was required.

*Example 10.*—Example 9 was repeated, utilizing a solution consisting of 4 grams NaOH, 150 cc. isopropyl alcohol, and 40 cc. perchlorethylene. Excellent results were obtained after 9 minutes.

*Example 11.*—Results similar to Example 10 were obtained utilizing a solution consisting of:

| | |
|---|---|
| NaOH | grams__ 4 |
| Ethanol | cc__ 150 |
| Perchlorethylene | cc__ 40 |

*Example 12.*—A solution was prepared consisting of:

| | |
|---|---|
| NaOH | grams__ 2.5 |
| Amyl alcohol | cc__ 100 |
| Perchlorethylene | cc__ 17 |
| Ethyl alcohol | cc__ 40 |

Excellent cleaning of a tin pan was obtained after 5 minutes using a light wipe, following the method steps outlined in Example 1. When tin strips were cut from the bottom of the pan they required light wiping in view of the decomposed condition of the silicone resin.

*Example 13*

| | | |
|---|---|---|
| Isopropyl alcohol | cc | 100 |
| NaOH | grams | 2.7 |
| Toluene | cc | 50 |
| Perchlorethylene | cc | 20 |

Excellent cleaning results were obtained with the above solution after 4 minutes at 60–65° C.

*Example 14*

| | | |
|---|---|---|
| Isopropyl alcohol | cc | 100 |
| NaOH | grams | 3.2 |
| H₂O | cc | 9 |
| Perchlorethylene | cc | 40 |

A silicone glazed test pan corner piece was immersed in this solution at 62° C.–52° C. The solution had a flash point of 87.5° F. After 6 minutes the test piece was removed from the solution and sprayed with water. Removal of silicone resin glaze was complete without requiring any wiping, and there was no tin attack.

*Example 15.*—A mixture was prepared consisting of 3 grams NaOH in 100 cc. "Pentasol," which is a commercial mixture of amyl alcohol isomers. The NaOH was only partly soluble. The mixture was not entirely effective to remove silicone resin from a test piece, particularly on the bottom, at 85° C. After adding 15 cc. perchlorethylene and treating a silicon glazed test piece as in the foregoing examples, at a temperature of 85–90° C., excellent cleaning was obtained after 8 minutes without wiping. Another test piece, immersed for 15 minutes under the same conditions, shows excellent cleaning and no tin attack.

*Example 16.*—The procedure of Example 15 was followed, substituting secondary butanol for the amyl alcohols. The addition of 15 cc. perchlorethylene materially improved the silicone removal.

*Example 17.*—A solution was prepared consisting of:

| | | |
|---|---|---|
| Perchlorethylene | cc | 90 |
| Secondary butanol | cc | 10 |
| CH₃ONa | grams | 1.0 |
| Nitrobenzene | cc | 2 |

After 5 minutes, following the procedure of Example 15, this solution gave good cleaning. Similar results are obtained substituting phenol or cresol for nitrobenzene. The presence of phenol or meta, para or ortho cresols serves not only to protect the tin surface but also appears to stabilize the solution as well, and to reduce its rate of decomposition.

*Example 18.*—The following table indicates other solutions which produce results substantially similar to the preceding examples.

| Alkali metal base | Chlorinated hydrocarbon | Alcohol |
|---|---|---|
| 2.3 grams KOH | 135 cc. methylene chloride | 15 cc. ethanol. |
| 2 grams KOH | 120 cc. CCl₄ | 150 cc. isopropanol. |
| 4 grams CH₃OK | 600 cc. methylene chloride | 150 cc. ethanol. |
| 2.5 grams NaOH | 17 cc. methylene chloride | 100 cc. amyl alcohol. |
| 2.5 grams KOH | 25 cc. CCl₄ | 100 cc. amyl alcohol. |
| 4 grams KOH | 40 cc. CCl₄ | 150 cc. ethanol. |
| .60 gram KOH | 66.7 grams methylene chloride. | 32.7 grams ethanol. |
| .60 gram CH₃OK | 66.7 grams CCl₄ | 32.7 grams ethanol. |

Having thus described my invention, I claim:

1. A composition for treating a hardened silicone resin glaze to make it water removable which consists essentially by weight of .02–5% alkali metal hydroxide, 1–97% chlorinated hydrocarbon selected from the group consisting of methylene chloride, carbon tetrachloride, and perchlorethylene, and the balance consisting of an alcohol selected from the group consisting of ethanol, isopropyl alcohol, n-propyl alcohol, n-butyl alcohol, isobutyl alcohol, secondary butyl alcohol, amyl alcohol, propylene glycol, dipropylene glycol and tripropylene glycol.

2. A composition for treating a hardened silicone resin glaze to make it water removable without wiping which consists essentially by weight of .05%–5.0% alkali metal base selected from the group consisting of sodium hydroxide and potassium hydroxide, 70%–95% chlorinated hydrocarbon selected from the group consisting of methylene chloride, carbon tetrachloride, and perchlorethylene, and 3.5%–29.95% alcohol selected from the group consisting of ethanol, isopropyl alcohol, n-propyl alcohol, n-butyl alcohol, isobutyl alcohol, secondary butyl alcohol, amyl alcohol, propylene glycol, dipropylene glycol and tripropylene glycol.

3. A composition for treating a hardened silicone resin glaze to make it removable without wiping from a metal surface by treatment with water, which consists essentially by weight of .05–1.5% alkali metal hydroxide, 70–95% perchlorethylene, and 3.5–29.95% ethanol.

4. A composition for treating a hardened silicone resin glaze consisting essentially by weight of:

| | Per cent |
|---|---|
| NaOH | .05–1.5 |
| Perchlorethylene | 70–95 |
| Ethanol | 3.5–29.95 |
| Phenol | .25–1.0 |

5. In a process for removing a hardened silicone resin glaze from an associated article having a surface containing tin without appreciably attacking said surface, the steps which comprise contacting the hardened silicone resin with a composition consisting essentially by weight of about .02–5% alkali metal hydroxide, 1–97% by weight chlorinated hydrocarbon selected from the group consisting of methylene chloride, carbon tetrachloride, and perchlorethylene, and substantially the balance an alcohol selected from the group consisting of ethanol, isopropyl alcohol, n-propyl alcohol, n-butyl alcohol, isobutyl alcohol, secondary butyl alcohol, amyl alcohol, propylene glycol, dipropylene glycol and tripropylene glycol, said alcohol being capable of and present in sufficient amount to dissolve substantially all of said alkali metal base and to mix with said chlorinated hydrocarbon to form a homogeneous liquid, maintaining said composition at a temperature of about 55–75° C. for a period sufficient to modify the hardened silicone resin glaze, separating the aforesaid composition from the article, and rinsing the surface of said article.

6. The method of removing hardened silicone resin glaze from a metal base having a surface containing tin without causing appreciable tin attack, comprising contacting the resin with a composition consisting essentially by weight of about .02–5% sodium hydroxide and 1–97% perchlorethylene in the balance of an alcohol selected from the group consisting of ethanol, isopropyl alcohol, n-propyl alcohol, n-butyl alcohol, isobutyl alcohol, secondary butyl alcohol, amyl alcohol, propylene glycol, dipropylene glycol and tripropylene glycol, maintaining said composition at about 55–75° C. for a period sufficient to modify the hardened silicone resin glaze, removing the base and glaze from said composition, contacting the modified resin with water, and removing the resulting material from said base.

7. The method of removing a hardened siloxane resinous coating from a tin surface without causing tin attack which comprises immersing the object to be cleaned in a .6% by weight solution of NaOH in a liquid consisting of about ⅓ by weight ethanol and ⅔ by weight perchlorethylene, maintaining said solution at a temperature of about 55–75° C. for a period sufficient to modify the hardened siloxane resinous coating, removing the object from the solution, and rinsing with water.

8. A composition for removing a hardened silicone resin glaze from an object having a tin surface without attacking said tin, consisting essentially of .1 gram NaOH, 5.2 grams ethanol and 94.7 grams perchlorethylene.

9. A solution for removing a hardened silicone resin glaze from an object having a tin surface without attacking said tin, consisting essentially of .6 gram NaOH, 32.7 grams ethanol and 66.7 grams perchlorethylene.

10. A solution for removing a hardened silicone resin glaze from an object having a tin surface without attacking said tin, consisting essentially of .05–1.5% by weight alkali metal hydroxide, 70–95% chlorinated hydrocarbon selected from the group consisting of methylene chloride, carbon tetrachloride and perchlorethylene, and the balance ethanol and .25–1% by weight phenol.

References Cited in the file of this patent

UNITED STATES PATENTS

| | | |
|---|---|---|
| 2,002,523 | Buc | May 28, 1935 |
| 2,445,064 | Hall et al. | July 13, 1948 |
| 2,637,670 | Brown | May 5, 1953 |

OTHER REFERENCES

Industrial Solvents, Mellan (second edition) Reinhold Pub. Co., New York (1950), pages 322–323, 347, 314.